(12) United States Patent  (10) Patent No.: US 8,276,126 B2
Farnham et al.                (45) Date of Patent:    Sep. 25, 2012

(54) DETERMINING CAUSES OF SOFTWARE REGRESSIONS BASED ON REGRESSION AND DELTA INFORMATION

(75) Inventors: Damien Farnham, Dublin (IE); Darrin P. Johnson, Mountain View, CA (US); Sean McGrath, Dublin (IE); Bart Smaalders, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1486 days.

(21) Appl. No.: 11/595,396

(22) Filed: Nov. 8, 2006

(65) Prior Publication Data

US 2008/0109790 A1    May 8, 2008

(51) Int. Cl.
    G06F 9/44  (2006.01)
(52) U.S. Cl. .................................................. 717/131
(58) Field of Classification Search ................ 717/101, 717/122, 126–131, 120, 168, 158; 714/38.1, 714/34, 38.14, 15, 37; 716/106, 136; 707/611
    See application file for complete search history.

(56) References Cited

U.S. PATENT DOCUMENTS

| | | | | |
|---|---|---|---|---|
| 6,301,701 B1 * | 10/2001 | Walker et al. | ................. | 717/125 |
| 7,320,090 B2 * | 1/2008 | Coulter et al. | ................. | 714/30 |
| 7,577,875 B2 * | 8/2009 | Nelson et al. | ............. | 714/38.14 |
| 2002/0066077 A1 * | 5/2002 | Leung | .......................... | 717/126 |
| 2003/0093716 A1 * | 5/2003 | Farchi et al. | ................... | 714/34 |
| 2004/0210884 A1 * | 10/2004 | Raghavachari et al. | ...... | 717/158 |
| 2006/0123389 A1 * | 6/2006 | Kolawa et al. | ................. | 717/101 |
| 2006/0168565 A1 * | 7/2006 | Gamma et al. | ................ | 717/122 |
| 2006/0225048 A1 * | 10/2006 | Jakubiak | ....................... | 717/127 |
| 2006/0265629 A1 * | 11/2006 | Kwong et al. | .................. | 714/38 |
| 2007/0006041 A1 * | 1/2007 | Brunswig et al. | ............... | 714/38 |
| 2007/0174702 A1 * | 7/2007 | Meyer | ............................. | 714/33 |

OTHER PUBLICATIONS

IBM Corp, "The Cell Systemsim", Systems and Technology Group: L2T1H1-20, May 2006, pp. 1-29; URL: <http://publib.boulder.ibm.com/infocenter/ieduasst/stgv1r0/topic/com.ibm.iea.cbe/cbe/1.0/Introduction/L2T1H1_20_SystemSim.pdf>.*
Cantrill et al, "Dynamic Instrumentation of Production Systems" Usenix Jun. 2004, p. 1-18.*
Cantrill, B. et al., "Dynamic Instrumentation of Production Systems" Sun Microsystems, 14 pages, Proceedings of 2004 Usenix Annual Technical Conf. Jul. 2004.

* cited by examiner

Primary Examiner — Tuan Anh Vu
(74) Attorney, Agent, or Firm — Osha Liang LLP

(57) ABSTRACT

Techniques for isolating software regressions are provided. In one approach, QTrace is used to generate DTrace scripts to gather timing information of one or more portions of source code during a test of particular version of a program. Based on results of one or more tests of multiple versions of a program, a regression is identified with respect to a particular portion of source code. It is determined that the particular portion of source code was changed during an intermediate version of the program (i.e., between two tests). The intermediate version and/or the particular portion of source code are identified as being a potential source of the regression.

10 Claims, 5 Drawing Sheets

DETERMINING CAUSES OF SOFTWARE REGRESSIONS BASED ON REGRESSION AND DELTA INFORMATION

BACKGROUND

In order to verify that software is functioning properly, the software must be adequately tested. Software testing is typically done after a threshold of change is reached to warrant the testing. Software testing may be performed during final integration of code or at intermediate stages in the development process, particularly in the case of more complex software packages.

Typically, testing is a manual process during which a set of test commands are entered manually by a test engineer. In order to test a larger, more complex software package, a batch file including a set of test commands is often executed. During a test session, a log file is often generated which includes the set of test commands and associated outputs. Typically, the log file is searched manually in order to identify software "bugs" (i.e., errors) and their possible causes. Errors, such as failed execution of a software package, are not the only software regressions that a test is designed to uncover. Software regressions also include slower execution times of the software package, modules, or portions of code compared with previous tests and/or developer expectations.

A log file may contain large amount of data and therefore searching through the log file for indications of software regressions may be a tedious process. Thus, the debugging of source code can be a time-consuming and cumbersome task.

Various debugging products are available for debugging source code written in various languages (e.g., C, C++). Using these debugging products, the values of various variables may be traced and lines of code may be stepped through to assist in debugging this source code. Such debugging tools commonly accept a program, with or without "source code", as input and execute it at the user's desired pace, displaying the source code lines that were executed and outputs resulting from these executed lines (e.g., debug information and program output).

Unfortunately, existing debugging tools are only appropriate for testing small sections of source code when many software packages include thousands of lines of code. Some examples of such packages are the Solaris system, available from Sun Microsystems, Inc. The Solaris system and comparable systems include many software packages that have complex interactions with each other in a non-deterministic fashion. Moreover, these types of packages are often built by hundreds, if not thousands, of engineers. As a result, the software changes may come from many different sources. In addition, such software modifications may affect a variety of system components other than the portion of code that has been modified. Thus, although it is possible to test each software change prior to its integration into a larger software system, it is often difficult to predict the second and higher order effects of the sum of the changes made to multiple portions of the software package. Accordingly, it is often difficult to identify a problematic portion of code upon a regression of a complex software package.

Platform variations may also complicate the software testing process. Often, companies develop software to run on multiple platforms. Since failures may occur due to hardware as well as software problems, it is typically desirable to run the software on different platforms to ascertain the source of the problem. However, execution of software may result in a regression on some platforms and exhibit no problems when run on a different platform, even where the cause of the problem is software-related. As a result, engineers are often overwhelmed by the numerous factors that must be considered when attempting to identify the source of a software failure.

In order to identify the cause of a particular software regression, brute force is typically used. One example of a brute force method is referred to as a binary search. To illustrate a binary search, the following description is provided.

The completion of a threshold of change of a software system is often referred to as a "build." FIG. 1 is a diagram representing two consecutive builds between which multiple code revisions of a program are performed. Typically, testing begins with a code base that is considered "clean" (i.e., relatively free of any known software bugs), illustrated in FIG. 1 as Build A 102. At a later date, a code base producing a regression is shown as Build B 204. Between two builds, there are often many code changes, illustrated as Delta 1 106, Delta 2 108 . . . Delta N 110. These changes may accumulate significantly in a short amount of time. It is not practical to fully test after each delta because there may be a hundred deltas that have occurred within a single day when a full test of the software package may require a week's time.

A binary search begins with testing the software system at point Delta N/2 (not shown). If the same software regression is identified with respect to Delta N/2, then the software system is tested at point Delta N/4 (not shown), and so forth until the source of the regression is identified.

Numerous man-hours are generally required in order to successfully test a particular software package, not to mention running an actual test corresponding to a single delta. As a result, each day that passes is extremely costly.

In view of the above, a need exists for a tool that aids in locating the cause of software regressions identified in a software system.

SUMMARY

An approach for identifying one or more versions of a program as being potential sources of a software regression is described herein. According to one embodiment, it is determined that a software regression may have occurred with respect to a portion of source code based upon a first set of test results and a second set of test results. The first set of test results represents results of testing a first version of a program and a second set of test results represents results of testing a second, later version of the program. The portion of source code is a subset of the program. It is also determined that the portion of source code was changed in a third version of the program. The third version of the program is an intermediate version between the first version and the second version. The third version of the program is identified as being a potential source of the software regression. The portion of source code of the third version may ultimately be identified as the source of the regression.

In one embodiment, the step of determining that the portion of source code was changed in a third version of the program comprises accessing a set of versioning information that comprises information for a plurality of versions of the program indicating which portions of source code were changed in each version. The step of determining further comprises processing the versioning information to determine that the portion of source code was changed in the third version of the program.

In one embodiment, the step of determining that regression may have occurred with respect to the portion of source code includes determining that the portion of source code was not fully executed during testing of the second version of the program.

In one embodiment, the step of determining that regression may have occurred with respect to the portion of source code includes determining that execution of the portion of source code caused an error during testing of the second version of the program.

In one embodiment, historical data associated with multiple portions of source code is also used to determine which other potential sources of the software regression.

DESCRIPTION OF THE DRAWINGS

The systems and methods described herein are illustrated by way of example, and not by way of limitation, in the figures of the accompanying drawings. Similar reference numbers are used throughout the drawings to reference similar elements and reference.

DESCRIPTION OF EMBODIMENT(S)

Techniques for identifying a version of a program as being a potential source of a regression are described herein. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In order to identify a version of a program as being a source of a software regression (while avoiding a brute force approach), software tools are used to: (1) identify which source code portions experienced a regression; and (2) identify in which version(s) the code portions were modified since a previous software build. One tool that may be used to identify which code portions experienced a regression is QTrace, which is a tool that provides code coverage information. QTrace has been extended to provide timing information for various portions of source code. QTrace may be configured to provide timing information of only the portions of source code that have changed since a previous build. QTrace may be used to determine whether a portion of source code experienced an error, whether the portion of source code ran slower than in a previous version, and other indicia of regression.

In addition to the regression information generated by QTrace, one embodiment of the invention also uses versioning information pertaining to the program. The versioning information specifies what portions of source code were changed in each version (also referred to as a "delta") of the program. With the regression information and the versioning information, it is possible to quickly isolate potential causes of regression, as will be elaborated upon below. QTrace may be further configured to access the versioning information and determine that the portion of source code was changed in one or more versions of the program.

In summary, up until now, two separate databases of information—regression information and versioning information—have been completely orthogonal and non-referenceable with respect to each other. Now, embodiments of the invention use the separate databases of information to quickly and efficiently locate potential sources of a regression.

Isolating a Software Regression

Figure 1:
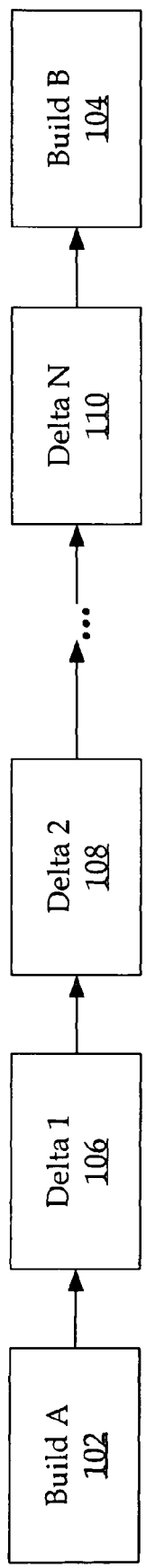
FIG. 1 is a diagram representing two consecutive builds between which multiple code revisions are performed.
Figure 2:
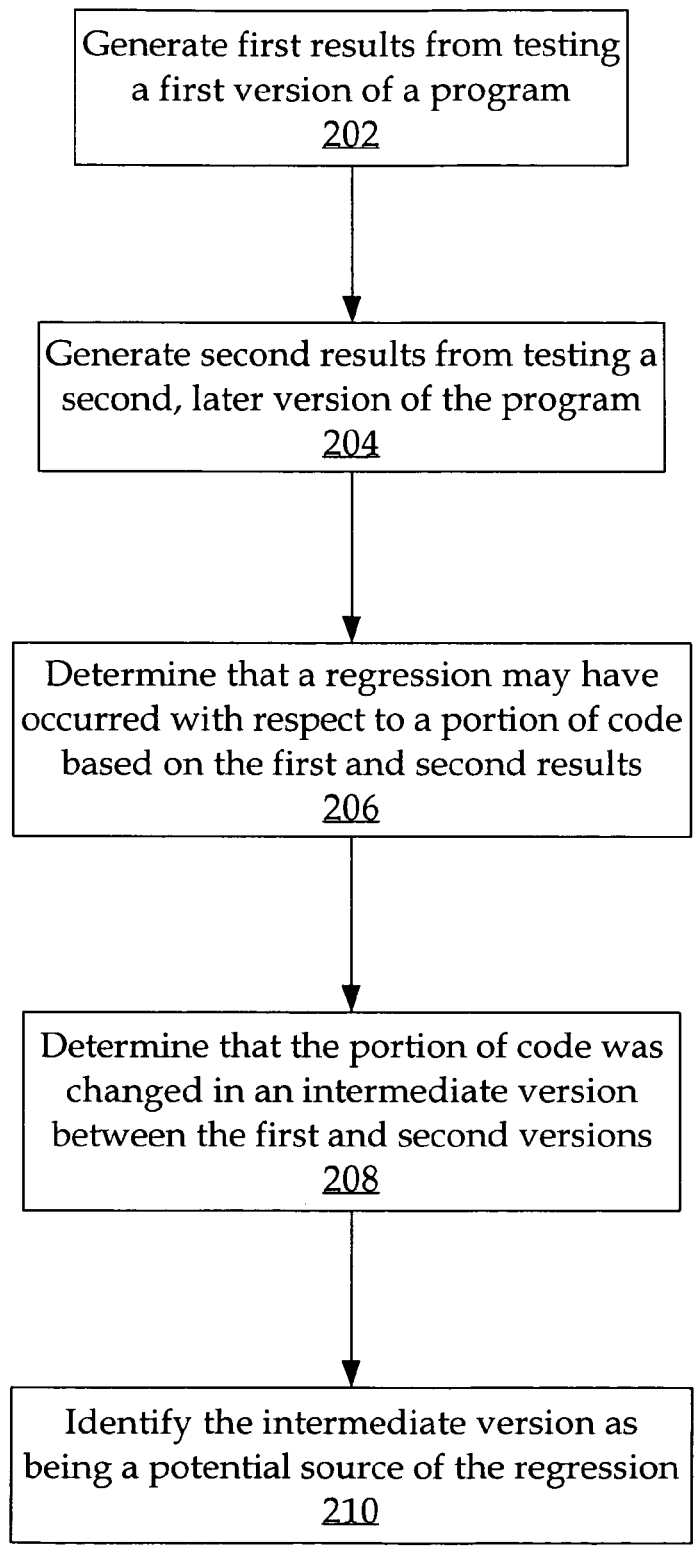
FIG. 2 is a flow diagram of how a portion of source code is identified as being a potential source of a regression, in accordance with an embodiment of the present invention.

FIG. 2 is a flow diagram of how a version of a program is identified as being a potential source of a regression, in accordance with an embodiment of the invention. At step 202, first test results of a first test are generated that represent results of testing a first version of a program (e.g., for example, Build A of FIG. 1). At step 204, second test results of a second test are generated that represent results of testing a second, later version of the program (for example, Build B of FIG. 1). One way in which the first and second test results may be generated is using DTrace and QTrace, which are described in more detail below.

At step 206, it is determined that a regression may have occurred with respect to a portion of source code based on the first and second test results. The second test results may indicate one or more error messages that occurred during execution of the portion of source code and/or that the portion of source code did not fully execute during the second test. Additionally or alternatively, comparing the first and second tests results may indicate that the portion of source code executed more slowly during the second test. Furthermore, comparing the first and second test results may indicate that the portion of source code executed unexpectedly faster during the second test. Although faster execution is usually a good sign, if the portion of source code is executing, e.g., five times faster than before, then there may be some part of the portion of source code that is not executing at all. The second test results may indicate an alert for any portion of source code that executes, for example, two or more times faster and two or more times slower.

At step 208, it is determined that the portion of source code identified in step 206 was changed in an intermediate version of the program that is between the first and second versions (for example, Delta 2 of FIG. 1). Versioning information pertaining to the software program being tested may be used to make this determination. Various techniques may be used to make this determination. For example, a request to integrate (RTI) may be used which lists files that have changed since a previous build. Furthermore, a source control log may be used which indicates source code that has been modified since the previous build and that maps to the corresponding source files. The source control log may be tens of thousands of lines in length. Therefore, the step of determining that a particular portion of source code was changed may be automated. In one embodiment, described in more detail below, QTrace is used to determine the intermediate version.

At step 210, because it was determined that: (1) a regression occurred with respect to the portion of source code identified in step 206; and (2) this portion of source code was changed in an intermediate version of the program, this intermediate version of the program is identified as being a potential source of the regression. Furthermore, this portion of source code of the intermediate version may be specifically identified as a potential source of the regression. Therefore, both the regression information and version information are used to quickly and efficiently identify potential sources of regression, despite the fact that the program being tested may contain millions of lines of code and many intermediate versions between builds.

Although hundreds or thousands of lines of code may have changed between software builds, a particular portion of source code is typically modified only one or a few times. Thus, only a few deltas or versions corresponding to the portion of source code may need to be examined before the actual source of the regression is identified. If there are multiple deltas in which the portion of source code was changed, the most recent delta may be ranked as the most likely candidate for causing the regression, following by the next most recent delta, and so on.

A majority of software regressions are first order regressions. A first order regression is one in which the regression is detected in the portion of source code that was actually changed. A second (and higher) order regression is one that is detected in one portion of source code but was caused by a change in another portion of source code. The process described above assists developers (and/or debuggers) in identifying a significant number of first order regressions.

DTrace

As stated previously with respect to steps 202 and 204, DTrace may be used to generate the test results described above. DTrace is a comprehensive dynamic tracing facility that may be used by administrators and developers to examine the behavior of both user programs and operating systems. DTrace has functionality similar to truss, apptrace, prex, and mdb, bundled into a single scriptable tool that may examine userland and/or kernel activity.

With DTrace, a user may explore a system to understand how the system works, track down performance problems across many layers of software, or locate the cause of aberrant behavior. Thus, DTrace is used for performance analysis, observability, troubleshooting, and debugging. Examples include watching disk I/O details live and timing userland functions to determine possible trouble portions of source code. DTrace may be used on live production systems with often negligible impact on performance. DTrace does not require restarting either the operating system or applications.

DTrace dynamically modifies, at runtime, the operating system kernel and user processes to record data at locations of interest, called probes. A probe is a location or activity to which DTrace can bind a request to perform a set of actions, like recording a stack trace, a timestamp, or the argument to a function. Probes may be viewed as programmable sensors scattered throughout a system in various places. DTrace probes come from a set of kernel modules called providers, each of which performs a particular kind of instrumentation to create probes.

Thus, DTrace changes the way programmers may trace applications. DTrace allows a user to see what is happening on a binary that is running on an operating system. DTrace may indicate how long a portion of source code or function takes to execute. DTrace may indicate how an application proceeds through a code path through each file even if the user does not have access to the source code.

DTrace includes a new scripting language called D which is designed specifically for dynamic tracing. D scripts are dynamically compiled into byte codes and inserted into the kernel. With DTrace, it is relatively straightforward to write scripts that dynamically turn on probes, and collect and process the gathered information. D scripts provide a convenient way for users to share their knowledge and troubleshooting methods with others.

Additional information pertaining to DTrace is available at http://www.sun.com/bigadmin/content/dtrace/.

QTrace

QTrace is a framework around DTrace that allows users to obtain code coverage information. QTrace is used to examine two sets of code and see whether each set of code uses the other (i.e., code coverage). QTtrace uses DTrace to generate D scripts in order to generate code coverage information. In one embodiment, QTrace is configured to provide timing information for multiple portions of source code by modifying the way QTrace generates D scripts.

QTrace indicates the code path (i.e., the code that is executed during a test) and how the code path relates to the source code of the operating system (i.e., where the application and operating system meet). QTrace was originally developed for gathering code coverage information for every line of code to indicate whether each line was executed. However, the level of granularity at which a user may view the code path may vary. For example, at a relatively high level of granularity, the code path may simply indicate which software modules are called during a test.

In one embodiment, the code coverage information may be filtered to indicate timing and other execution information of only portions of source code that were modified since a previously tested version of the overall program.

Thus, DTrace and QTrace may be used together to isolate a known regression, which is unrelated to their individual purposes (i.e., tracing applications for DTrace and code coverage for QTrace).

QTrace Interface

Figure 3:
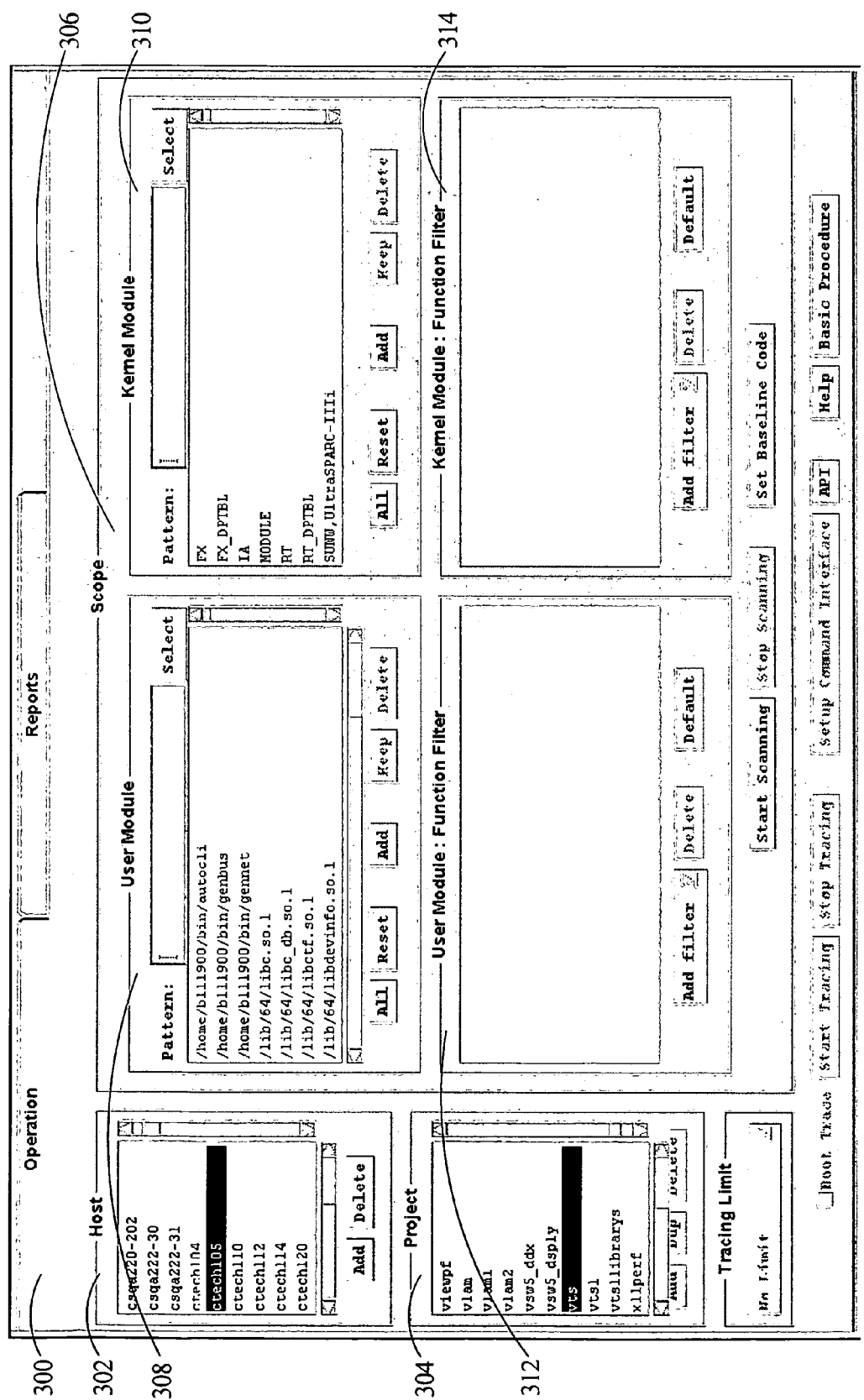
FIG. 3 illustrates an example Operations window of a QTrace tool, in accordance with an embodiment of the present invention.

The QTrace tool may include a GUI that comprises an Operation window and a Reports window. The Operation window may be used to: (1) identify the relevant modules and functions in software to be tested; (2) trace cumulative coverage of modules and functions; and (3) reduce performance impacts caused by tracing. An example of an Operation window is illustrated in FIG. 3.

Figure 4:
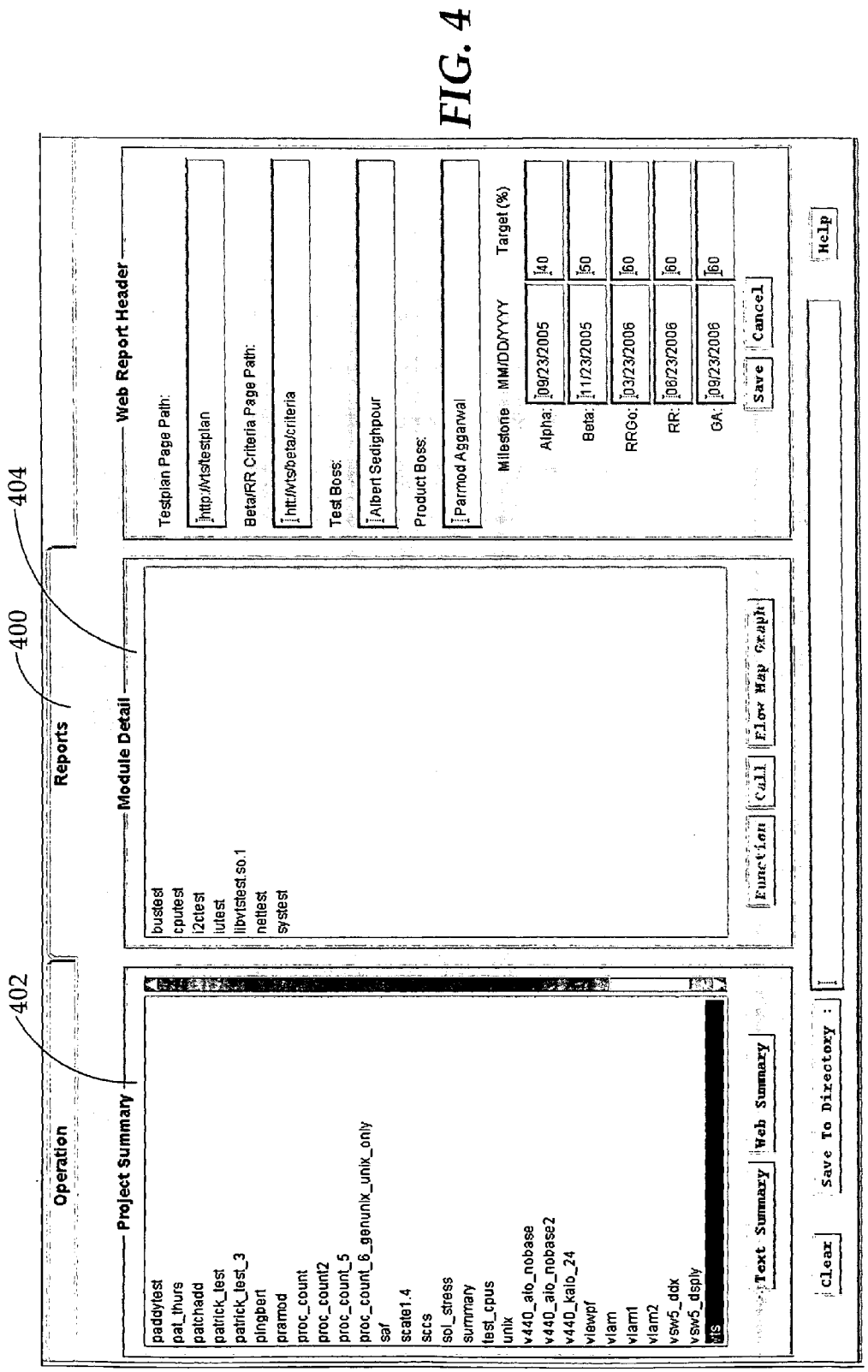
FIG. 4 illustrates an example Reports window of a QTrace tool, in accordance with an embodiment of the present invention.

The Reports window may be used to: (1) read coverage reports for a project and its corresponding modules; and (2) examine detailed flow maps for functions in a project's module. An example of a Reports window is illustrated in FIG. 4.

Module Scope Procedures

QTrace has the potential to trace all modules that are run on a selected host. The Scope area 306 of Operation window 300 enables a user to identify the modules that are part of a project. A user may be selective about which user modules and kernel modules are traced. The following two sections describe how to, using the QTrace interface, scan and identify modules of a project and identify which modules will be traced.

Scanning and Identifying Modules for a Project

The first step is to identify modules that are executed by the software that is being tested. The next step is to select the modules that are of most interest for tracing coverage during testing.

A host may then be selected in Host panel 302 in Operation window 300. The host is a system on which the software to be tested is to be run. A project is selected in Project panel 304.

Modules that are already identified for the selected project might be listed within Scope panel 306.

On the selected host, the user starts executing the program that is to be scanned. If the scan is to identify modules executed in early stages of running the software, then the user should begin executing the program after scanning has begun.

To begin scanning, the user may select the Start Scanning button in Operation window 300. The user may enter the root password (if required) for the host in the small window that appears and selects Ok. Modules that are running on the host system may be listed in panels (e.g., 308 and 310) as they are identified.

When sufficient modules have been identified, the user may stop scanning by selecting the Stop Scanning button. The listed modules may be saved as part of the current project. The user may add further modules to the project by repeating the above procedure.

Some relevant modules might only appear when the software is run under different conditions or on a different host. For example, some modules might differ depending on 32-bit or 64-bit operation, or presence of different peripheral devices on the host. Module information may accumulate in QTrace when multiple sessions of scanning are performed for the same project.

If a user already knows the details about any modules that the user desires to trace in a project, then the user may identify those modules manually rather than through scanning the running software. First, in Operation window 300, a project name in Project panel 304 is selected. Second, in the appropriate Module panel (i.e., either User Module 308 or Kernel Module 310), the Add button is selected. Third, the name of the module is entered in the small window that appears. Fourth, an Ok button is selected in the small window. The new module may then be listed in the appropriate panel. The user may repeat this process for each module that the user desires to add manually to the project.

Identifying which Modules will be Traced

The QTrace tool may be configured to trace all the modules whose names are highlighted in Operation window 300. Thus, if none of the items in the Module panels are highlighted, then a user may not be able to start tracing. First, in Operation window 300, a project name in Project panel 304 is selected. Names of modules already identified for the selected project may be listed in the Module panels.

Second, the name of each module that the user desires to trace at this time is highlighted. If a module is highlighted and the user does not desire that module to be traced, then the name of the module may be selected again to remove the highlighting. If the user desires to highlight all the module names, the All button under the appropriate Module panel may be selected. This may be useful if the user desires to trace all modules or remove only specific modules from the tracing scope. In order to remove highlighting from all modules, the user may select the Reset button.

In order to highlight all modules with names containing a search pattern, the user may use the Pattern tool at the top of the appropriate Module panel.

Third, when the scope for a trace is defined according to the user's desires, the user may proceed to perform tracing procedures at any time. The selected tracing scope may remain in effect for a project until it is subsequently changed.

Function Filtering Procedures

A user may further limit the scope of tracing by filtering the functions within any module to identify only specific functions to be traced. First, in Operation window 300, a project name in Project panel 304 is selected. The names of modules that are already identified for the project may be listed in the Module panels. Modules that are already identified for tracing may be highlighted.

Second, the arrow on the Add Filter button below the appropriate Module panel is selected. As a result, a drop-down menu listing all the highlighted modules may appear.

Third, one of the module names from the menu is selected and, as a result, a small window may appear.

Fourth, a filtering string is entered, in the small window, that is applied to corresponding functions within the highlighted module. The filtering string may use wild card expressions. For example, in order to trace all functions that begin with the string 'abc', a user may enter 'abc*' as the filter. After the user is finished entering a string, the user may select the Ok button a small window that appears. The filter definition may then appear in the appropriate Function Filter panel (either 312 or 314). If the user wishes to define additional filtering strings for modules in the same project, this procedure may be repeated, beginning with the second step.

Fifth, before tracing begins, the user may highlight the filter items that the user desires to apply during the tracing session. To remove all filter restrictions on modules, the user may select the Default button below the Function Filter panel.

Controlling Tracing Using QTrace

In the QTrace tool, the tracing function activates a particular daemon that traces coverage of chosen modules and functions on a host. Tracing results for multiple hosts used for testing in the course of a single project may be accumulated in a consolidated project report.

The particular daemon causes tracing to take place and saves results whenever a module or function identified for tracing is called during testing. The tracing functions use the hosts, projects, modules, functions, and scoping definitions previously established by a user, such as those described above.

For some testing projects, it is desirable to trace items executed at the time a system boots. Thus, QTrace provides a Boot Trace option that allows a user to include tracing at that stage when needed.

Additionally, or alternatively, to controlling tracing operations (e.g., through Operation window 300), QTrace may provide an API that recognizes commands that may be included in a test script.

QTrace Tracing Procedures

First, in Operation window 300, a name in Host panel 302 is selected. If tracing is already active on that host, a message may appear at the top of the QTrace window. Typically, only one project at a time is allowed to be traced on a single host.

Second, a project name in Project panel 304 is selected. The scope of modules selected for tracing should be verified.

Third, Boot Trace and Tracing Limit options should be selected, if desired, in Operation window 300.

Fourth, software to be tested should be verified as ready to run on the selected host. Depending on what aspects of the software that a user is interested in tracing, the user may choose to have the software already running before tracing has begun.

Fifth, the Start Tracing button at the bottom of Operation window 300 is selected. When no module has been selected for tracing, this button might not be selectable.

In order to trace a program from the beginning of its execution, then the program to be tested should be started after the Start Tracing button is selected.

Tracing Limit

To reduce the impact of tracing on execution of the tested software, additional features of Operation window 300 may be used to place additional limits on tracing. A user may also limit the amount of tracing information saved in a report when the Tracing Limit option is selected. By setting a limit, the performance impact of the tracing process may be reduced. A limit may also help focus the data included in a report so the report can be more manageable for its intended purpose.

By default, while tracing is active, all activity involving selected modules and functions may be traced and included in report data. The number of instances that are traced and recorded for any given module or function during a tracing session may be limited. When the specified limit is reached, QTrace may stop tracing that item for the remainder of the current tracing session. Typically, a user is not allowed to reset the Tracing Limit option while tracing is active. The chosen numeric limit may apply to all items. Any limit may be applied, such as no limit, one, ten, 53, 100, 123, 874, etc.

If a user's only interest is determining if the modules and functions are covered at all, setting a limit of 1 instance is sufficient. A higher limit may be chosen if the user desires greater accuracy in the hit count. In a QTrace report, a particular symbol (e.g., >) may indicate that the hit count for a function reached the tracing limit.

Reports Window

In the QTrace tool, Reports window 400 of FIG. 4 enables users to view coverage reports for each project and flow map diagrams for each application module or kernel module in that project. In one embodiment, project reports are available in two formats: Text Summary and Web Summary.

Whichever summary type of a project is selected, a report is generated and displayed to the user. Some items listed in the report may include the items in the following table.

Module-specific reports may also be displayed by (a) selecting a project in Summary panel 402, (b) a module in Module Detail panel 404, and (c) the Call or n button in Module Detail panel 404. Some items listed in the module report may the items in the following table.

| Items in Module-Specific Report | |
|---|---|
| Item | Explanation |
| Dead? | Dead function which means that the function neither calls nor called by other functions. |
| New\|Mod | Whether the function is (N)ew, (M)odified or the (S)ame after comparing the current module with baseline module. |
| Hit Cnt. | Number of times traced. |
| Act./Exp. | Actual/Expected |
| Ave. Elapse Time (ns) | Average elapsed time (in nanoseconds). |
| Exit-Coverage | Coverage in terms of exit and return location. |
| Offset | The maximum traced exit location relative to the entry of the function. |
| Size | Function size in terms of byte. |
| ExecutionName | Execution name. |

Therefore, QTrace is one mechanism that may be used to generate results of testing software builds. QTrace may be further configured to automatically analyze results to detect any failures or errors in executing the test. QTrace may be further configured to automatically compare timing information between corresponding portions of source code of different software builds. Such analysis may indicate that a regression has occurred with respect to a certain portion of source code.

After the portion of source code is identified, versioning information may be accessed where the versioning information comprises information for multiple versions of the program. The information may indicate which portions of source code were changed in each version. The versioning information is processed to determine that the portion of source code was changed in an intermediate version of the program (i.e.,

| Items in Project Summary Report | |
|---|---|
| Item | Explanation |
| #Func | Number of functions in a module. |
| #Call | Number of calling pairs in a module. |
| #Rtrn | Number of exits and returns in a module. |
| Cmplx | The overall complexity of a module based on the following formula: #Call + #Rtrn − #Func + 1 |
| #Dead | Number of functions that are not reachable. This only occurs in executable module but not in shared library module. |
| #New\|Mod | Number of new or modified functions in a module. |
| Func Not Covered | Number of functions not covered. |
| Call Not Covered | Number of calls not covered |
| Function coverage: Entry | The ratio between the number of traced functions and the number of expected functions. |
| Function coverage: Size | The ratio between combined size of traced functions and combined size of expected functions. |
| Function coverage: Exit | The ratio between the number of traced exits and the number of expected exits. |
| Function coverage: Block | The ratio between combined maximum offset of exit location of traced functions and combined size of expected functions. |
| Call-coverage: Pairs | The ratio between the number of traced calling pairs and the number of expected calling pairs. |
| Call-coverage: Links | The ratio between the number of traced calling links and the number of expected calling links. | between the tested software builds). Versioning information may be explicit in the source code in addition to being explicit in the versions of the binaries themselves. In one embodiment, QTrace determines the versions of each source code portion that is examined.

Thus, the intermediate version is identified as a potential source of the identified regression. The portion of source code within the intermediate version may be the first place to verify that that portion is indeed the source of the regression Historical Data The portion of source code may be identified further based on historical data associated with the portion of source code, which is described in U.S. patent application Ser. No. 11/388, 445, entitled PROBABILISTIC SYSTEM FOR IDENTIFYING SOFTWARE DEVELOPMENT REGRESSIONS filed on Mar. 24, 2006, now abandoned, and incorporated by reference as if fully set forth herein. Initially, historical data associated with a plurality of portions of source code may be accessed. The historical data that is accessed may be historical data for each of the portions of source code. Alternatively, the historical data that is accessed may be limited to the historical data associated with the portions of source code that have been modified (e.g., since the immediately previous software build). The historical data may be obtained over one or more software builds.

The historical data that is accessed may include a variety of raw data and/or analysis obtained from the raw data. For instance, the historical data for each set of software instructions may indicate a set of one or more individuals responsible for generating or modifying the corresponding set of software instructions. The historical data associated with each set of software instructions may also indicate a geographical region (e.g., company group, site, or department) of a set of one or more individuals responsible for generating or modifying the corresponding set of software instructions. The historical data associated with each set of software instructions may also include an indication of an architecture and/or platform on which the corresponding set of software instructions was tested. Other examples of historical data that may be associated with each set of software instructions includes an indicator of a date, time and/or proximity to a deadline met by the generation or modification of the corresponding set of software instructions. For instance, a modification made late at night or closer to the deadline may be more error prone than a modification made earlier in the day or further from the deadline (e.g., enabling the modification to be tested as appropriate before integration into the software system).

From the historical data such as that set forth above, it is possible to identify one or more portions of source code that are likely to be the source of the regression. For instance, some or all of the historical data may be analyzed to ascertain a probability or frequency of failure for one or more portions of source code. In this manner, one or more portions of source code having the highest likelihood of being problematic may be identified. As one example, the portions of source code that are identified may be those that have been modified during the current software build (or a prior software build), where the historical data is obtained over one or more software builds.

One or more of the identified portion(s) of source code are then tested. The testing of the identified portions may be performed manually, or may be performed in an automated fashion. More particularly, the testing may be performed in a particular order that has been generated based upon the historical data and/or analysis of the historical data. Testing may be performed until a portion of source code including a software modification causing failure is identified. Thus, all of the identified portions of source code need not be tested.

In one embodiment, the portion of source code including a delta with the largest probability of generating a failure may be tested first. If failure is not found, then the next portion of source code including a delta having the next largest probability of generating a failure may be evaluated. This process may continue until the portion of source code including a delta causing failure is isolated.

Hardware Overview

Figure 5:
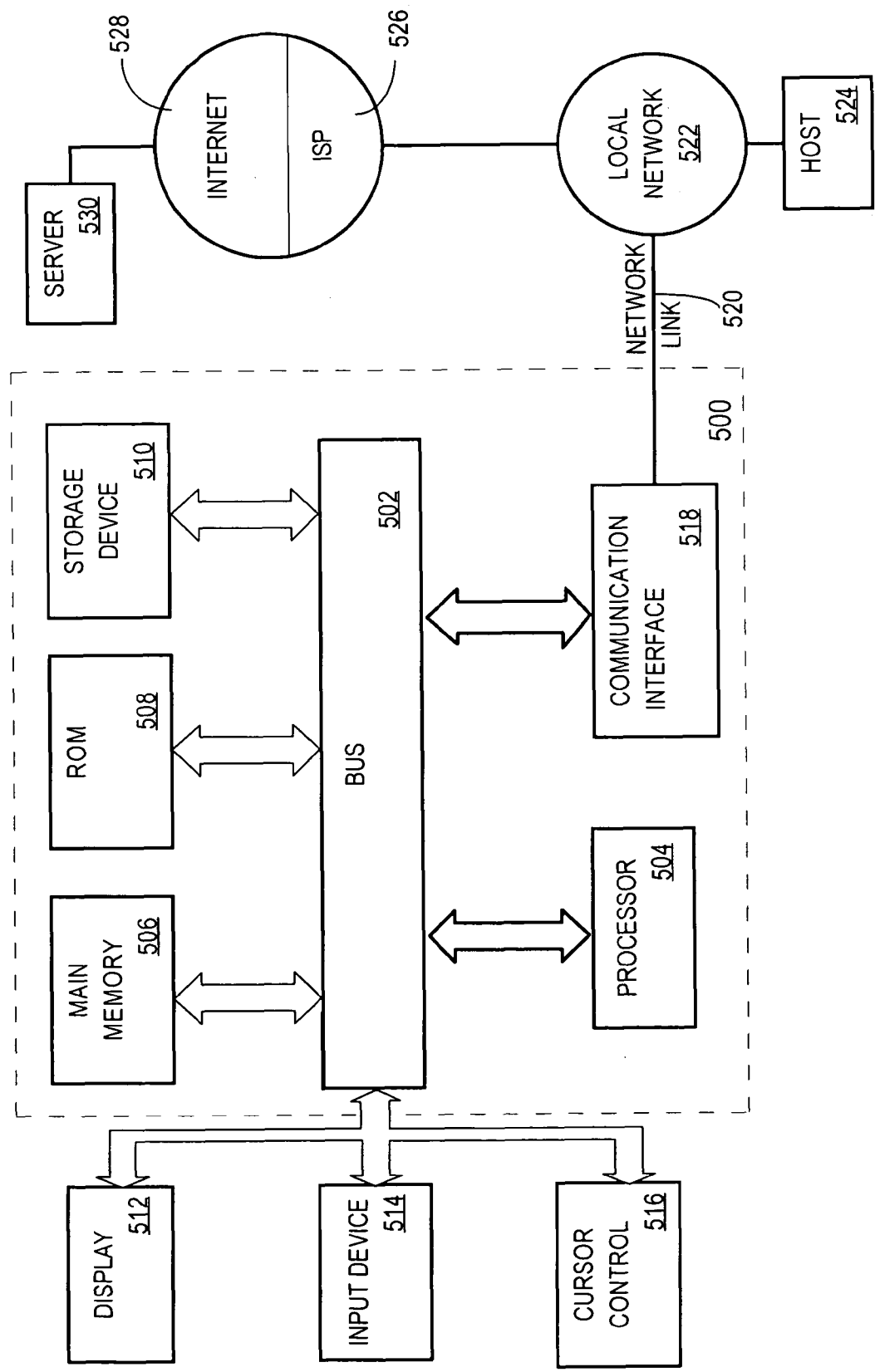
FIG. 5 is a block diagram that illustrates a computer system upon which an embodiment in accordance with the present invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for the tools and techniques described herein. According to one embodiment of the invention, tools and techniques are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for techniques as described herein.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

The invention claimed is:

1. A machine-implemented method, comprising:
   executing a first test on a first version of a program to obtain a first set of test results;
   executing, after executing the first test, a second test on a second version of the program to obtain a second set of test results, wherein the second version of the program is created after a first version of the program;
   detecting a potential regression by:
     comparing the second set of test results with the first set of test results to detect a slower execution time during the second test than during the first test; and
     identifying, from a plurality of portions of source code, a portion of source code having the slower execution time by:
       accessing historical information to determine a modification time for each of the plurality of portions of source code, wherein the modification time defines when the corresponding portion of source code is modified,
       analyzing the modification time of each of the plurality of portions of source code to ascertain a probability of failure for each of the plurality of portions of source code,
       selecting, from the plurality of portions of source code, the portion of source code having the highest probability of failure, and
       testing the portion of source code having the highest probability of failure to identify the portion of source code as the portion of source code having the slower execution time,
     wherein the portion of source code is a subset of the program, and
     wherein the potential regression is the slower execution time;
   determining, after detecting the potential regression, and using versioning information, that the portion of source code changed in a third version of the program, wherein the third version of the program is an intermediate version created between the first version and the second version; and
   identifying, based on the slower execution time of the portion of source code and the determining that the portion of source code changed in the third version of the program, the third version of the program as being a potential source of the potential regression.

2. The method of claim 1, wherein identifying the portion of source code having the slower execution time further comprises analyzing at least one selected from a group consisting of at least one individual responsible for modifying the corresponding portion of source code and a geographical location of the at least one individual to further ascertain the probability of failure of the corresponding portion of source code.

3. The method of claim 1, wherein the versioning information identifies each portion of source code changed in each version of the program, wherein a plurality of versions are created between creation of the first version of the program and creation of the second version of the program.

4. The method of claim 1, wherein the first set of test results and second set of test results are generated using DTrace scripts.

5. The method of claim 4, wherein the DTrace scripts are generated using QTrace.

6. A non-transitory computer readable medium comprising:
  instructions for causing one or more processors to execute a first test on a first version of a program to obtain a first set of test results;
  instructions for causing one or more processors to execute, after executing the first test, a second test on a second version of the program to obtain a second set of test results;
  instructions for causing one or more processors to detect a potential regression by:
    comparing the second set of test results with the first set of test results to detect a slower execution time during the second test than during the first test; and
    identifying, from a plurality of portions of source code, a portion of source code having the slower execution time by:
      accessing historical information to determine a modification time, for each of the plurality of portions of source code, wherein the modification time defines when the corresponding portion of source code is modified,
      analyzing the modification time of each of the plurality of portions of source code to ascertain a probability of failure for each of the plurality of portions of source code,
      selecting, from the plurality of portions of source code, the portion of source code having the highest probability of failure, and
      testing the portion of source code having the highest probability of failure to identify the portion of source code as the portion of source code having the slower execution time,
      wherein the portion of source code is a subset of the program, and
      wherein the potential regression is the slower execution time;
  instructions for causing one or more processors to determine, after detecting the potential regression, and using versioning information that the portion of source code changed in a third version of the program, wherein the third version of the program is an intermediate version created between the first version and the second version; and
  instructions for causing one or more processors to identify, based on the slower execution time of the portion of source code and the determining that the portion of source code changed in the third version of the program, the third version of the program as being a potential source of the potential regression.

7. The non-transitory computer readable medium of claim 6, wherein identifying the portion of source code having the slower execution time further comprises analyzing at least one selected from a group consisting of at least one individual responsible for modifying the corresponding portion of source code and a geographical location of the at least one individual to further ascertain the probability of failure of the corresponding portion of source code.

8. The non-transitory computer readable medium of claim 6, wherein the versioning information identifies each portion of source code changed in each version of the program, wherein a plurality of versions are created between creation of the first version of the program and creation of the second version of the program.

9. The non-transitory computer readable medium of claim 6, wherein the first set of test results and second set of test results are generated using DTrace scripts.

10. The non-transitory computer readable medium of claim 9, wherein the DTrace script are generated using QTrace.

* * * * *